United States Patent
Hozumi

(10) Patent No.: US 10,199,789 B2
(45) Date of Patent: Feb. 5, 2019

(54) METAL-CARBONACEOUS BRUSH AND METHOD OF MANUFACTURING THE SAME

(71) Applicant: TOYO TANSO CO., LTD., Osaka-shi, Osaka (JP)

(72) Inventor: Fumihiro Hozumi, Kagawa (JP)

(73) Assignee: TOTAN KAKO CO. LTD., Kagawa (JP)

(*) Notice: Subject to any disclaimer, the term of this patent is extended or adjusted under 35 U.S.C. 154(b) by 165 days.

(21) Appl. No.: 15/026,784

(22) PCT Filed: Oct. 1, 2014

(86) PCT No.: PCT/JP2014/005024
§ 371 (c)(1),
(2) Date: Apr. 1, 2016

(87) PCT Pub. No.: WO2015/049867
PCT Pub. Date: Apr. 9, 2015

(65) Prior Publication Data
US 2016/0240989 A1    Aug. 18, 2016

(30) Foreign Application Priority Data
Oct. 2, 2013 (JP) ................. 2013-207494

(51) Int. Cl.
*H01R 39/22* (2006.01)
*H01R 39/20* (2006.01)
(Continued)

(52) U.S. Cl.
CPC ........... *H01R 39/22* (2013.01); *C04B 35/522* (2013.01); *C04B 35/532* (2013.01); *H01R 39/20* (2013.01);
(Continued)

(58) Field of Classification Search
CPC ........ H01R 39/20; H01R 43/12; H01R 39/22; H01R 39/26; C04B 35/522; C04B 35/532
(Continued)

(56) References Cited

U.S. PATENT DOCUMENTS 3,751,294 A * 8/1973 Fridman .................. B05D 7/26
252/502
3,996,408 A * 12/1976 Fridman ................ H01R 39/22
252/511
(Continued)

FOREIGN PATENT DOCUMENTS

CN 1701487 A 11/2005
CN 1956280 A 5/2007
(Continued)

OTHER PUBLICATIONS

International Search Report dated Dec. 22, 2014, issued in counterpart International Application No. PCT/JP2014/005024 (2 pages).
(Continued)

*Primary Examiner* — Naishadh Desai
(74) *Attorney, Agent, or Firm* — Westerman, Hattori, Daniels & Adrian, LLP

(57) ABSTRACT

A carbonaceous material is fabricated by a mixture of carbon powder and a binder. 10% by weight or more and 60% by weight or less of metal powder to the fabricated carbonaceous material is mixed. The mixed carbonaceous material and metal powder are pressurized and formed. A brush base material is fabricated by burning of the pressurized and formed carbonaceous material and metal powder. The fabricated brush base material is impregnated with oil. An impregnation rate of the oil to the mixed carbonaceous material and metal powder may be 0.5% by weight or more, for example.

11 Claims, 4 Drawing Sheets

(51) Int. Cl.
  *H01R 39/26* (2006.01)
  *H01R 43/12* (2006.01)
  *C04B 35/52* (2006.01)
  *C04B 35/532* (2006.01)
  *C22C 1/05* (2006.01)

(52) U.S. Cl.
  CPC ............ *H01R 39/26* (2013.01); *H01R 43/12* (2013.01); *C04B 2235/3262* (2013.01); *C04B 2235/407* (2013.01); *C04B 2235/425* (2013.01); *C04B 2235/446* (2013.01); *C04B 2235/48* (2013.01); *C04B 2235/5436* (2013.01); *C04B 2235/604* (2013.01); *C22C 1/05* (2013.01)

(58) Field of Classification Search
  USPC .................................................. 310/220–239
  See application file for complete search history.

(56) References Cited

U.S. PATENT DOCUMENTS

| | | | | |
|---|---|---|---|---|
| 4,358,319 A | * | 11/1982 | Yoshida | H01R 43/08 29/597 |
| 4,420,704 A | * | 12/1983 | Mabuchi | H01R 39/46 310/220 |
| 4,443,726 A | * | 4/1984 | Ikegami | H01R 39/24 310/239 |
| 4,605,581 A | * | 8/1986 | Stevens | H01R 39/20 310/229 |
| 5,281,176 A | * | 1/1994 | Yahagi | H01R 4/04 29/885 |
| 5,387,832 A | * | 2/1995 | Tanaka | H01R 39/24 29/597 |
| 5,798,178 A | | 8/1998 | Sperling et al. | |
| 5,932,949 A | * | 8/1999 | Ziegler | H01R 39/045 310/235 |
| 7,622,844 B1 | * | 11/2009 | Kuhlmann-Wilsdorf | H01R 39/24 310/229 |
| 2001/0024735 A1 | * | 9/2001 | Kuhlmann-Wilsdorf | H01R 39/22 428/611 |
| 2002/0019319 A1 | * | 2/2002 | Denpo | B82Y 30/00 508/113 |
| 2003/0127941 A1 | * | 7/2003 | Otani | H01R 39/22 310/252 |
| 2004/0100160 A1 | * | 5/2004 | Potocnik | H01R 39/045 310/236 |
| 2004/0110076 A1 | * | 6/2004 | Yamazaki | G03G 9/0834 430/106.2 |
| 2005/0212376 A1 | * | 9/2005 | Niimi | H01R 39/24 310/251 |
| 2007/0013258 A1 | | 1/2007 | Kobayashi | |
| 2009/0022973 A1 | | 1/2009 | Miyazawa | |
| 2009/0230814 A1 | | 9/2009 | Yanagizawa | |
| 2012/0294912 A1 | * | 11/2012 | Fukui | A61K 8/0254 424/401 |

FOREIGN PATENT DOCUMENTS

| | | | | |
|---|---|---|---|---|
| CN | 202888581 U | | 4/2013 | |
| EP | 1 489 705 A2 | | 12/2004 | |
| EP | 1 662 640 A1 | | 5/2006 | |
| EP | 1662640 A1 | * | 5/2006 | ............ H01R 39/20 |
| GB | 2 389 358 A | | 12/2003 | |
| GB | 2389358 A | * | 12/2003 | ............ H01R 39/20 |
| JP | 59-97367 A | | 6/1984 | |
| JP | 59-155870 U | | 10/1984 | |
| JP | 59-211983 A | | 11/1984 | |
| JP | 60-216702 A | | 10/1985 | |
| JP | 3-49546 A | | 3/1991 | |
| JP | 3-93614 A | | 4/1991 | |
| JP | 03088291 A | * | 4/1991 | |
| JP | 3-85298 U | | 8/1991 | |
| JP | 3-178543 A | | 8/1991 | |
| JP | 8-130078 A | | 5/1996 | |
| JP | 2789690 B2 | | 8/1998 | |
| JP | 10-336973 A | | 12/1998 | |
| JP | 2000-197315 A | | 7/2000 | |
| JP | 2001-25216 A | | 1/2001 | |
| JP | 2001-346363 A | | 12/2001 | |
| JP | 2002-506608 A | | 2/2002 | |
| JP | 3328865 B2 | | 9/2002 | |
| JP | 2004-14294 A | | 1/2004 | |
| JP | 2004-159437 A | | 6/2004 | |
| JP | 2005-102491 A | | 4/2005 | |
| JP | 2005-176492 A | | 6/2005 | |
| JP | 3808666 B2 | | 8/2006 | |
| JP | 3858038 B2 | | 12/2006 | |
| JP | 2007-49894 A | | 2/2007 | |
| JP | 2007-325401 A | | 12/2007 | |
| WO | 2006/115118 A1 | | 11/2006 | |
| WO | 2007/055164 A1 | | 5/2007 | |

OTHER PUBLICATIONS

Office Action dated Sep. 5, 2017, issued in counterpart Chinese Application No. 201480054538.9., with English translation. (15 Pages).

Extended (supplementary) European Search Report dated May 11, 2017, issued in counterpart European Patent Application No. 14850455.8. (8 pages).

* cited by examiner

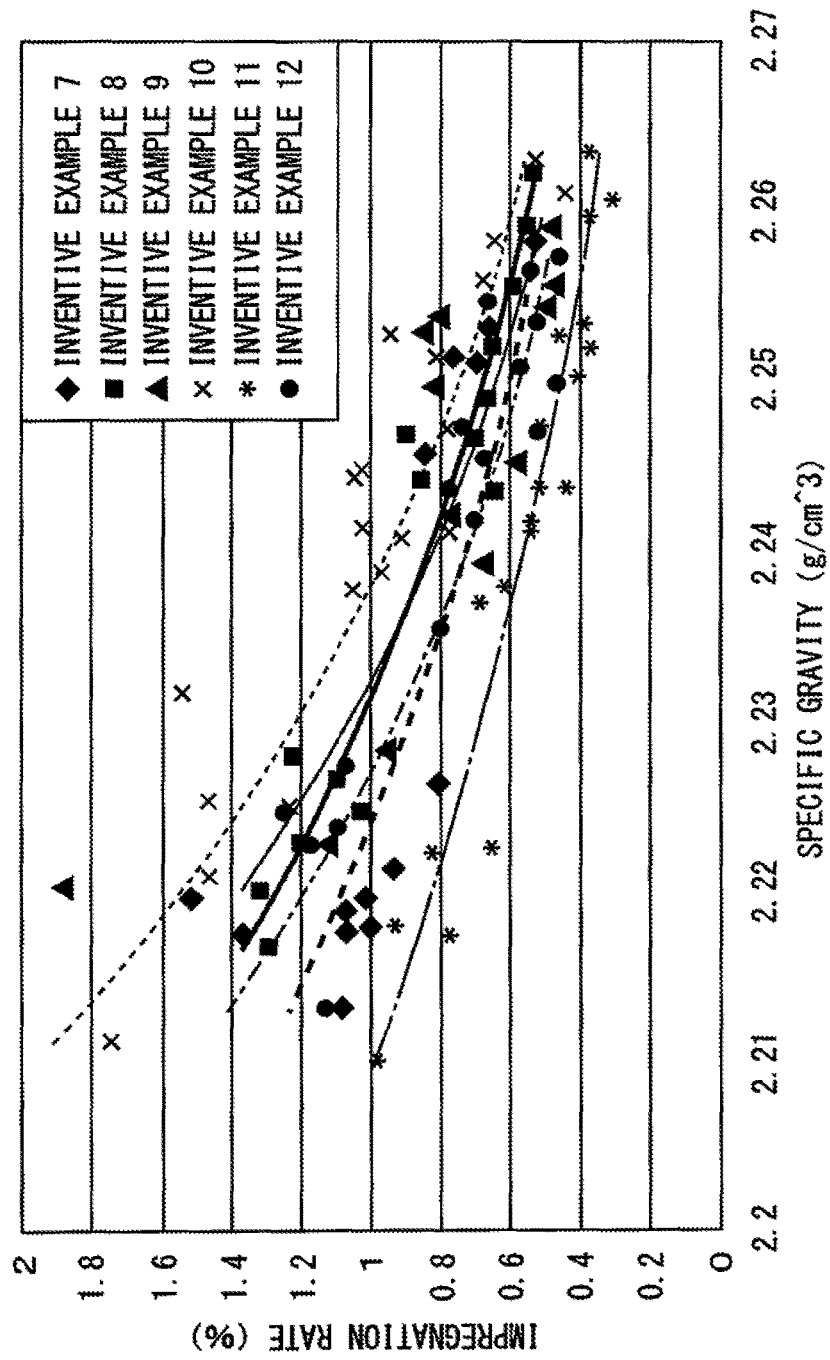
F I G. 3

METAL-CARBONACEOUS BRUSH AND METHOD OF MANUFACTURING THE SAME

TECHNICAL FIELD

The present invention relates to a meta-carbonaceous brush used in a motor and a method of manufacturing the metal-carbonaceous brush.

BACKGROUND ART

Motors including brushes are used in various types of electrical instruments for domestic use and industrial use, automobiles, and the like. A metal-carbonaceous brush is used as a brush of a DC motor. For example, the metal-carbonaceous brush is fabricated by mixing of graphite powder and copper powder, and baking and pressure forming of the mixture (Patent Document 1, for example).

[Patent Document 1] WO 2007/055164 A1

SUMMARY OF INVENTION

Technical Problem

Conventionally, the motors were used for appliances that generate noise such as vacuum cleaners or electric drills, so that noise prevention characteristics were not required for motors. However, in recent years, noise prevention characteristics are required for motors used in media appliances for CDs (Compact Discs) or DVDs (Digital Versatile Discs) installed in automobiles, for example. Noise of motors cannot be suppressed by the brush of Patent Document 1.

An object of the present invention is to provide a metal-carbonaceous brush capable of suppressing noise of a motor and a method of manufacturing the metal-carbonaceous brush.

Solution to Problem (1) According to one aspect of the present invention, a metal-carbonaceous brush includes a carbonaceous material made of a plurality of carbonaceous particles, metal mixed with the carbonaceous material, and oil with which the carbonaceous material is impregnated, wherein a ratio of the metal mixed with the carbonaceous material to the carbonaceous material is 10% by weight or more and 60% by weight or less.

In this metal-carbonaceous brush, metal is mixed with the carbonaceous material made of a plurality of carbonaceous particles. A ratio of the metal mixed with the carbonaceous material to the carbonaceous material is 10% by weight or more and 60% by weight or less. In this configuration, the carbonaceous material is impregnated sufficiently with oil. In this case, characteristics of wireless interference of the metal-carbonaceous brush are improved. Further, Sliding noise of the metal-carbonaceous brush is suppressed by a reduction in wear of the metal-carbonaceous brush and a commutator. As a result, noise of the motor can be suppressed.

(2) An impregnation rate of the oil to the mixed carbonaceous material and metal may be 0.5% by weight or more.

In this case, characteristics of wireless interference of the metal-carbonaceous brush can be improved more sufficiently. Further, the wear of the metal-carbonaceous brush and the commutator can be reduced more sufficiently. Thus, noise of the motor can be suppressed more sufficiently.

(3) In an atmosphere having a temperature of 120° C. a reduction rate of an impregnation rate of the oil may be 1% or less in 400 hours.

When the temperature of the metal-carbonaceous brush rise due to friction between the metal-carbonaceous brush and the commutator, viscosity of the oil will decrease. Even in such a case, exudence of the oil from the carbonaceous material is prevented by a reduction in reduction rate of the impregnation rate of the oil. Thus, lubricity of the metal-carbonaceous brush can be maintained for a long period of time. Further, a contaminant in the vicinity of the metal-carbonaceous brush due to the exudence of the oil from the carbonaceous material can be prevented.

(4) The oil may include a synthetic hydrocarbon oil, an ester oil, a mineral oil or a petroleum hydrocarbon oil, or a mixed oil of these. In this case, the carbonaceous material can be impregnated easily with the oil.

(5) The oil may be a mixed oil of 90% by weight or more and 99% by weight or less of the synthetic hydrocarbon oil and 1% by weight or more and 10% by weight or less of a silicone oil.

In this case, characteristics of wireless interference of the metal-carbonaceous brush are improved more sufficiently. Further, the oil with which the carbonaceous material is impregnated is kept for a long period of time. Thus, noise of the motor can be suppressed more sufficiently for a long period of time.

(6) The oil may be a mixed oil of 90% by weight or more and 99.5% by weight or less of the synthetic hydrocarbon oil and 0.5% by weight or more and 10% by weight or less of a dimethyl silicone oil.

In this case, characteristics of wireless interference of the metal-carbonaceous brush are improved more sufficiently. Thus, noise of the motor can be suppressed more sufficiently.

(7) The metal may include electrolytic copper powder. In this case, electrical conductivity of the metal-carbonaceous brush can be ensured while an increase in cost is suppressed.

(8) According to another aspect of the present invention, a method of manufacturing a metal-carbonaceous brush includes the steps of fabricating a carbonaceous material by mixing carbon powder and a binder, mixing 10% by weight or more and 60% by weight or less of metal to the fabricated carbonaceous material, forming the mixed carbonaceous material and metal, thermally processing the formed carbonaceous material and metal, and impregnating the thermally processed carbonaceous material with oil.

In this method of manufacturing the metal-carbonaceous brush, the carbonaceous material is fabricated by a mixture of the carbon powder and the binder. 10% by weight or more and 60% by weight or less of metal to the fabricated carbonaceous material is mixed. The mixed carbonaceous material and metal are formed. The formed carbonaceous material and metal are processed thermally. The thermally processed carbonaceous material is impregnated with oil.

In this method, the carbonaceous material is impregnated sufficiently with the oil. In this case, characteristics of wireless interference of the metal-carbonaceous brush are improved. Further, the sliding noise of the metal-carbonaceous brush is suppressed by a reduction in wear of the metal-carbonaceous brush and the commutator. As a result, noise of the motor can be suppressed.

(9) The step of forming the carbonaceous material and metal may include pressurizing the carbonaceous material and metal such that the carbonaceous material and metal have a specific gravity of 2.26 g/cm$^3$ or less.

In this case, a reduction in size of pores of the carbonaceous material is suppressed. Thus, a reduction in impregnation rate of the oil into the carbonaceous material can be prevented.

(10) The step of impregnation with oil may include immersing the carbonaceous material and metal in oil having a temperature of 80° C. or more and 120° C. or less. In this case, the impregnation rate of the oil into the carbonaceous material can be improved.

(11) The step of impregnation with oil may include immersing the carbonaceous material and metal in oil having a temperature of 90° C. or more and 110° C. or less. In this case, the impregnation rate of the oil into the carbonaceous material can be improved more sufficiently.

Advantageous Effects of Invention

The present invention enables the noise of the motor to be suppressed.

BRIEF DESCRIPTION OF DRAWINGS

FIG. 3 is a graph showing results of measurement of a relationship between an impregnation condition and an impregnation rate of the oil.

DESCRIPTION OF EMBODIMENTS

A metal-carbonaceous brush according to one embodiment of the present invention will be described below with reference to drawings.

(1) Configuration of Brush

Figure 1:
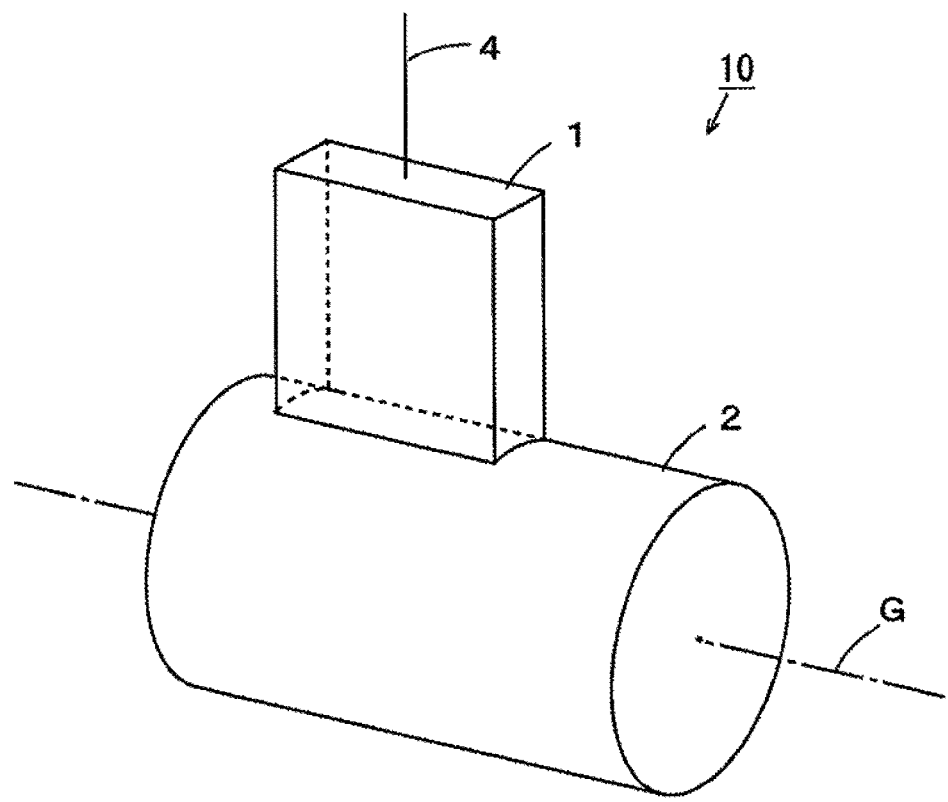
FIG. 1 is a schematic perspective view of a DC motor using a metal-carbonaceous brush according to a present embodiment.

FIG. 1 is a schematic perspective view of a DC motor using the metal-carbonaceous brush according to the present embodiment (hereinafter abbreviated as a brush). The DC motor 10 of FIG. 1 includes the brush 1 and a rotating body 2. The rotating body 2 is a commutator, and provided to be rotatable around a rotation axis G. A lead wire 4 is connected to the brush 1. One end of the brush 1 comes into contact with an outer peripheral surface of the rotating body 2.

An electric current is supplied from a power source (not shown) to the brush 1 through the lead wire 4. The rotating body 2 is rotated around the rotation axis G by supply of the current from the brush 1 to the rotating body 2. The brush 1 slides with respect to the rotating body 2 by rotation of the brush rotating body 2.

In the present embodiment, a brush base material is fabricated by mixing of a carbonaceous material and metal powder, and pressure forming of the mixture. Thereafter, the brush 1 is manufactured by impregnation of the brush base material with oil.

While the brush 1 is used in the DC motor 10 in the present embodiment, the present invention is not limited to this. The brush 1 may be used in an AC motor.

(2) Method of Manufacturing Brush

The method of manufacturing the brush 1 will be described. First, the carbonaceous material is fabricated by granulation. Specifically, the carbonaceous material is fabricated by kneading of carbon powder and a binder. As the carbon powder, graphite powder is preferably used. As the graphite powder, natural graphite powder, artificial graphite powder, expanded graphite powder or the like can be used, and a mixture of more than one of these may be used. In the present example, the carbon powder is natural graphite.

As the binder, a synthetic resin can be used, any one of a thermosetting synthetic resin and a thermoplastic synthetic resin may be used, or a mixture of these may be used. As the preferable examples of the binder, these may be mentioned, an epoxy resin, a phenol resin, a polyester resin, a vinylester resin, a furan resin, a polyamide resin, a polyimide resin or the like. In the present example, the binder is a composition in which a phenol resin and a dissolving liquid of methanol are kneaded.

Next, the carbonaceous material and the metal powder are mixed. A ratio of the metal powder to the total weight of the mixture is 10% by weight or more and 60% by weight or less. As the metal powder, copper powder is used, for example. Further, as the copper powder, electrolytic copper powder is preferably used. In this case, electrical conductivity of the brush 1 can be ensured while an increase in cost is suppressed. Apparent density of the electrolytic copper powder is preferably 0.70 or more and 1.20 or less, and a particle diameter of the electrolytic copper powder is preferably 10 μm or more and 40 μm or less.

As the copper powder, the copper powder fabricated by an atomizing method or a stamping method may be used instead of the electrolytic copper powder. Further, silver powder may be used instead of the copper powder. As the silver powder, electrolytic silver powder, the silver powder fabricated by the atomizing method or the stamping method, and the like may be used. Alternatively, another metal powder such as silver plating copper powder may be used instead of the copper powder.

One or more types of tungsten, tungsten carbide, molybdenum and sulfides of tungsten, tungsten carbide and molybdenum may be added to the mixture of the carbonaceous material and the metal powder as an additive. A ratio of the additive to the total weight of the carbon powder and the binder is 0.1% by weight or more and 10% by weight or less, for example, and is preferably 1% by weight or more and 5% by weight or less.

Next, pressure forming of the mixture of the carbonaceous material and the metal powder is performed. The brush base material is fabricated by thermal processing of the formed mixture at 400° C. or more and 900° C. or less in a nitrogen or ammonia reduction atmosphere or in a vacuum. Thereafter, the fabricated brush base material is impregnated with oil. The impregnation with oil is performed by immersion of the brush base material in the oil for 40 minutes, for example. The temperature of the oil is 80° C. or more and 120° C. or less, for example, is 90° C. or more and 110° C. or less preferably, and is 100° C. more preferably. In this case, an impregnation rate of the oil into the carbonaceous material can be improved. Thus, the fabrication of the brush 1 is completed.

The oil includes a synthetic hydrocarbon oil, an ester oil, a mineral oil or a petroleum hydrocarbon oil. In the present embodiment, the oil is a mixed oil of 95% by weight or more and 99% by weight or less of the petroleum hydrocarbon oil (a lubricant oil, a pot oil), and 1% by weight or more and 5% by weight or less of the silicone oil.

The silicone oil includes a dimethyl silicone oil (a dimethyl polysiloxane oil), a methyl phenyl silicone oil and a methylhydrogenpolysiloxane silicone oil. An impregnation rate of oil to the brush base material is 0.5% by weight or more preferably and is 0.5% by weight or more and 5% by weight or less more preferably.

(3) Effects

In the brush 1 according to the present embodiment, the metal powder is mixed with the carbonaceous material made of the carbonaceous powder and the binder. The ratio of the metal powder mixed with the carbonaceous material to the carbonaceous material is 10% by weight or more and 60% by weight or less. In this configuration, the carbonaceous material is impregnated sufficiently with the oil. In this case, characteristics of wireless interference of the brush 1 are improved. Further, the sliding noise of the brush 1 is suppressed by a reduction in wear of the brush 1 and the rotating body 2. As a result, noise of the DC motor 10 can be suppressed.

In the case where the impregnation rate of the oil to the brush base material is 0.5% by weight or more, the characteristics of wireless interference of the brush 1 can be improved more sufficiently. Further, the wear of the brush 1 and the rotating body 2 can be reduced more sufficiently.

(4) Relationship Between Type of Oil and Magnitude of Noise

Brush base materials used in the inventive examples 1 to 12 and the comparative example 1, described below, were fabricated by the following steps. First, a phenol resin was added as a binder to natural graphite, and molybdenum disulfide was added as an additive to the natural graphite. Then, a carbonaceous material was fabricated by kneading of the natural graphite at a room temperature. Then, the fabricated carbonaceous material was dried by a hot-air dryer.

An average particle diameter of the natural graphite is 50 μm, and a ratio of ash of the natural graphite is 0.5% or less. A ratio of the natural graphite to the total weight of the natural graphite and the phenol resin is 85% by weight, and a ratio of the phenol resin to the total weight of the natural graphite and the phenol resin is 15% by weight. A ratio of the molybdenum disulfide to the total weight of the natural graphite and the phenol resin is 3% by weight.

Next, the carbonaceous material was grounded into granules such that a ratio of the carbonaceous material having a particle diameter of 250 mesh or less was 30% or more and 60% or less. Subsequently, 20% by weight of electrolytic copper powder was mixed with the granulated carbonaceous material. An average particle diameter of the electrolytic copper powder is 20 μm.

Thereafter, pressure forming of the mixture of the carbonaceous material and the electrolytic copper powder was performed. The pressure during the pressure forming is 2 t/cm$^2$. Next, the brush base material was fabricated by thermal processing (carbonization) of the mixture at 600° C. to 800° C. in an inert gas atmosphere.

In the inventive example 1, the oil was fabricated by a mixture of 99.5% by weight of a synthetic hydrocarbon oil (oil having a kinematic viscosity of 68 mm$^2$/s at 40° C. by the DIN standard 51561) and 0.5% by weight of a dimethyl silicone oil. Hereinafter, the oil of the inventive example 1 is referred to as a first oil. The brush base material was impregnated with the first oil by immersion of the brush base material in the first oil having a temperature of 100° C. for 40 minutes. In this manner, the brush according to the inventive example 1 was manufactured.

In the inventive example 2, the oil was fabricated by a mixture of 99% by weight of a petroleum hydrocarbon oil and 1% by weight of a methyl phenyl silicone oil. Hereinafter, the oil of the inventive example 2 is referred to as a second oil. A method of manufacturing the brush according to the inventive example 2 is similar to the method of manufacturing the brush according to the inventive example 1 except that the second oil is used instead of the first oil.

In the inventive example 3, the oil was fabricated by a mixture of 90% by weight of a petroleum hydrocarbon oil and 10% by weight of a methyl phenyl silicone oil. Hereinafter, the oil of the inventive example 3 is referred to as a third oil. A method of manufacturing the brush according to the inventive example 3 is similar to the method of manufacturing the brush according to the inventive example 1 except that the third oil is used instead of the first oil.

In the inventive example 4, the oil was fabricated by a mixture of 97% by weight of a petroleum hydrocarbon oil and 3% by weight of a dimethyl silicone oil. Hereinafter, the oil of the inventive example 4 is referred to as a fourth oil. A method of manufacturing the brush according to the inventive example 4 is similar to the method of manufacturing the brush according to the inventive example 1 except that the fourth oil is used instead of the first oil.

In the inventive example 5, the oil was fabricated by a mixture of 94% by weight of a petroleum hydrocarbon oil and 6% by weight of a dimethyl silicone oil. Hereinafter, the oil of the inventive example 5 is referred to as a fifth oil. A method of manufacturing the brush according to the inventive example 5 is similar to the method of manufacturing the brush according to the inventive example 1 except that the fifth oil is used instead of the first oil.

In the inventive example 6, the oil was fabricated by a mixture of 90% by weight of a petroleum hydrocarbon oil and 10% by weight of a dimethyl silicone oil. Hereinafter, the oil of the inventive example 6 is referred to as a sixth oil. A method of manufacturing the brush according to the inventive example 6 is similar to the method of manufacturing the brush according to the inventive example 1 except that the sixth oil is used instead of the first oil.

In the comparative example 1, a brush was manufactured without impregnation of a brush base material with oil.

Compositions of the first to sixth oil are shown in Table 1. A plurality of motors respectively including the brushes according to the inventive examples 1 to 6 and the comparative example 1 were prepared. As for these motors, the relationship between the type of oil and magnitude of the noise generated from the brush was measured by performance of an EMI (Electro Magnetic Interference) test based on CISPR14-1 standard in a condition of the DC (Direct Current) 36 V.

TABLE 1

| Oil | | Composition | |
|---|---|---|---|
| Inventive Example 1 | First Oil | Petroleum Hydrocarbon Oil 99.5% by weight | Dimethyl Silicone Oil 0.5% by weight |
| Inventive Example 2 | Second Oil | Petroleum Hydrocarbon Oil 99% by weight | Methyl Phenyl Silicone oil 1% by weight |
| Inventive Example 3 | Third Oil | Petroleum Hydrocarbon Oil 90% by weight | Methyl Phenyl Silicone oil 10% by weight |
| Inventive Example 4 | Fourth Oil | Petroleum Hydrocarbon Oil 97% by weight | Dimethyl Silicone Oil 3% by weight |
| Inventive Example 5 | Fifth Oil | Petroleum Hydrocarbon Oil 94% by weight | Dimethyl Silicone Oil 6% by weight |
| Inventive Example 6 | Sixth Oil | Petroleum Hydrocarbon Oil 90% by weight | Dimethyl Silicone Oil 10% by weight |

Figure 2:
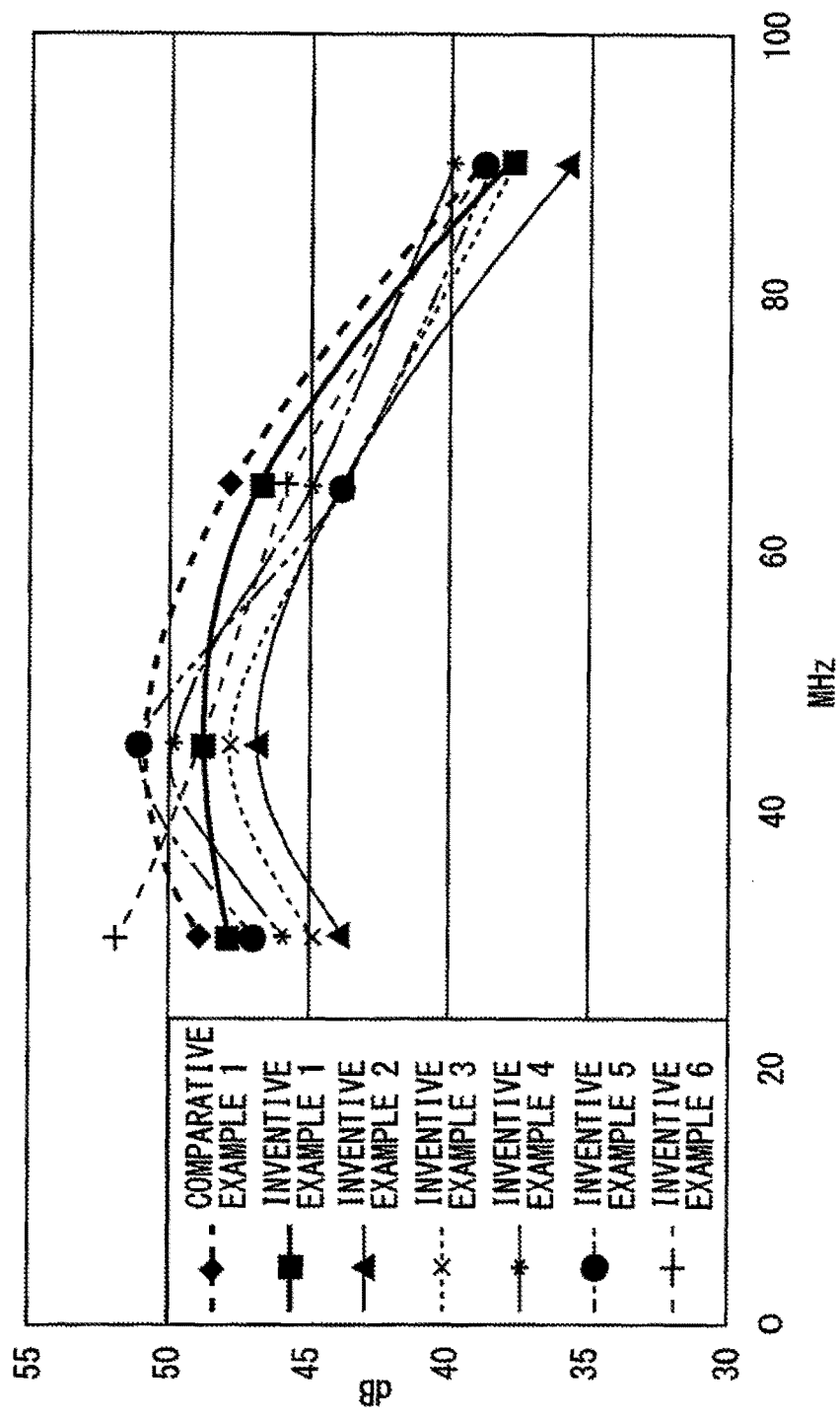
FIG. 2 is a graph showing results of measurement of a relationship between a type of oil and magnitude of generated noise.

FIG. 2 is a graph showing results of measurement of the relationship between the type of oil and the magnitude of the generated noise. The ordinate of FIG. 2 indicates the magnitude of the noise, and the abscissa of FIG. 2 indicates the frequency of the noise.

As shown in FIG. 2, the noise generated from the brushes according to the inventive examples 1 to 6 is reduced more sufficiently than the noise generated from the brush according to the comparative example 1 over a wide band of frequency from 30 MHz to 90 MHz. In particular, the noise generated from the brush according to the inventive example 2 was reduced more sufficiently than the noise generated from the brushes according to the inventive examples 1, and 3 to 6, and was reduced more sufficiently than the noise generated from the brush according to the comparative example 1 by about 5 dB at a maximum.

From the results of comparisons among the inventive examples 1 to 6 and the comparative example 1, it was confirmed that the noise generated from the brush could be reduced over a wide frequency band by impregnation of the brush base material with the oil. In particular, it was confirmed that the noise generated from the brush was largely reduced by impregnation of the brush base material with the second oil.

(5) Relationship Between Impregnation Condition and Impregnation Rate of Oil

In the inventive example 7, a plurality of brush base materials having a specific gravity of 2.21 g/cm$^3$ or more and 2.26 g/cm$^3$ or less were fabricated. The specific gravity of the brush base material was adjusted by a change in pressure during pressure forming. The brush base material was impregnated with the second oil by immersion of the brush base material in the second oil having a temperature of 80° C. for 20 minutes. In this manner, the brush according to the inventive example 7 was manufactured.

A method of manufacturing the brush according to the inventive example 8 is similar to the method of manufacturing the brush according to the inventive example 7 except that the brush base material is immersed in the second oil having a temperature of 80° C. for 40 minutes.

A method of manufacturing the brush according to the inventive example 9 is similar to the method of manufacturing the brush according to the inventive example 7 except that the brush base material is immersed in the second oil having a temperature of 100° C. for 20 minutes.

A method of manufacturing the brush according to the inventive example 10 is similar to the method of manufacturing the brush according to the inventive example 7 except that the brush base material is immersed in the second oil having a temperature of 100° C. for 40 minutes.

A method of manufacturing the brush according to the inventive example 11 is similar to the method of manufacturing the brush according to the inventive example 7 except that the brush base material is immersed in the second oil having a temperature of 120° C. for 20 minutes.

A method of manufacturing the brush according to the inventive example 12 is similar to the method of manufacturing the brush according to the inventive example 7 except that the brush base material is immersed in the second oil having a temperature of 120° C. for 40 minutes.

As for the brushes according to the inventive examples 7 to 12, the relationship between the impregnation condition and the impregnation rate of the oil was measured. The impregnation conditions of the oil in the inventive examples 7 to 12 are shown in Table 2.

TABLE 2

| | Impregnation Condition | |
|---|---|---|
| | Temperature | Time |
| Inventive Example 7 | 80° C. | 20 minutes |
| Inventive Example 8 | 80° C. | 40 minutes |
| Inventive Example 9 | 100° C. | 20 minutes |
| Inventive Example 10 | 100° C. | 40 minutes |
| Inventive Example 11 | 120° C. | 20 minutes |
| Inventive Example 12 | 120° C. | 40 minutes |

FIG. 3 is a graph showing the results of measurement of the relationship between the impregnation condition and the impregnation rate of the oil. The ordinate of FIG. 3 indicates the impregnation rate of the oil, and the abscissa of FIG. 3 indicates the specific gravity of the brush base material before impregnation with the oil.

As shown in FIG. 3, it was confirmed that the smaller the specific gravity of the brush base material was, the more sufficiently the impregnation rates of oil into the brushes according to the inventive examples 7 to 12 were improved. It is considered that the smaller the specific gravity of the brush base material is, the more sufficiently a reduction in size of pores of the brush base material is suppressed, and thus the brush base material is impregnated easily with the oil.

Further, from the comparison between the inventive examples 7 and 8, the comparison between the inventive examples 9 and 10, the comparison between the inventive examples 11 and 12, it was confirmed that the longer the brush base material was immersed in the oil, the more sufficiently the impregnation rate of the oil into the brush was improved.

Further, the impregnation rate of the oil into the brush according to the inventive example 9 was larger than the impregnation rates of the oil into the brushes according to the inventive examples 7 and 11, and the impregnation rate of the oil into the brush according to the inventive example 10 was larger than the impregnation rates of the oil into the brushes according to the inventive examples 8 and 12. Therefore, it was confirmed that the impregnation rate of the oil into the brush was improved more sufficiently by the impregnation of the brush base material with the oil having a temperature of 100° C. than the impregnation of the brush base material with the oil having a temperature of 80° C. or 120° C.

From these results, it was confirmed that the impregnation rate of the oil into the brush was improved more sufficiently by the immersion of the brush base material having a small specific gravity in the oil at an appropriate temperature for a long period of time.

(6) Relationship Between Elapsed Time and Impregnation Rate of Oil

In the inventive examples 13, 14, 15, brush base materials (MF-701 manufactured by Toyo Tanso Co., Ltd.) having different masses from one another were prepared. The masses of the inventive examples 13 to 15 are respectively about 1.945 g, about 1.937 g and about 1.925 g. The brushes according to the inventive examples 13 to 15 were manufactured by impregnation of these brush materials with the second oil.

In the comparative examples 2, 3, 4, the same brush base materials as the brush base materials of the inventive examples 13, 14, 15 were prepared. The brushes according to the comparative examples 2 to 4 were manufactured using these brush base materials.

Figure 4:
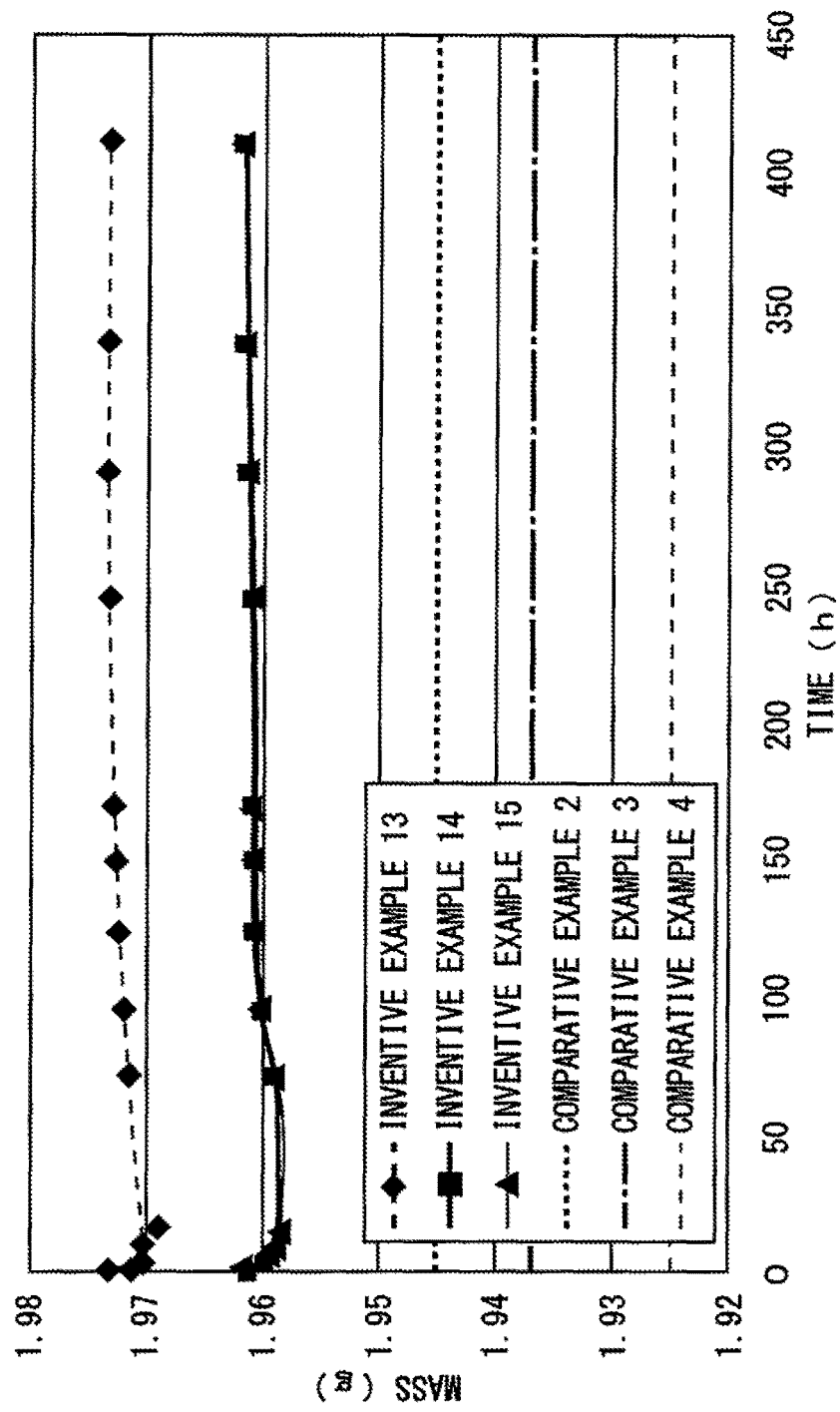
FIG. 4 is a graph showing results of measurement of a relationship between an elapsed time and a mass of a brush.

The brushes according to the inventive examples 13 to 15, and the comparative examples 2 to 4 were left in an atmosphere having a temperature of 120° C., and changes in mass of the brushes over time were measured, whereby the relationship between the elapsed time and the impregnation rate of the oil into the brushes according to the inventive examples 13 to 15 was measured. FIG. 4 is a graph showing results of measurement of the relationship between the elapsed time and the mass of the brush. The ordinate of FIG. 4 indicates the mass of the brush, and the abscissa of FIG. 4 indicates the elapsed time.

As shown in FIG. 4, the masses of the brushes according to the inventive examples 13 to 15 hardly changed even if 400 hours has elapsed since the start of measurement. Further, the masses of the brushes according to the comparative examples 2 to 4 did not change even if 400 hours have elapsed since the start of measurement. From these results, it was confirmed that the impregnation rate of the oil into the brushes according to the inventive examples 13 to 15 hardly changed even if 400 hours have elapsed since the start of measurement.

In this manner, the second oil is kept in the brush base material for a long period of time. Therefore, noise of the DC motor can be suppressed more sufficiently over a long period of time by use of the brush impregnated with the second oil.

Table 3 shows a maximum reduction rate of the impregnation rate of the oil in the case where the brushes according to the inventive examples 13 to 15 are left in an atmosphere having a temperature of 120° C. for 400 hours.

TABLE 3

|  | Initial Impregnation Rate | Minimum Impregnation Rate | Maximum Reduction Rate |
| --- | --- | --- | --- |
| Inventive Example 13 | 1.469% | 1.219% | 0.250% |
| Inventive Example 14 | 1.224% | 1.022% | 0.202% |
| Inventive Example 15 | 1.836% | 1.635% | 0.201% |

As shown in Table 3, the initial impregnation rate of the oil into the brush according to the inventive example 13 was 1.469%, and the minimum impregnation rate of the oil into the brush according to the inventive example 13 was 1.219%. Therefore, the maximum reduction rate of the impregnation rate of the oil into the brush according to the inventive example 13 was 0.250%.

The initial impregnation rate of the oil into the brush according to the inventive example 14 was 1.224%, and the minimum impregnation rate of the oil into the brush according to the inventive example 14 was 1.022%. Therefore, the maximum reduction rate of the impregnation rate of the oil into the brush according to the inventive example 14 was 0.202%.

The initial impregnation rate of the oil into the brush according to the inventive example 15 was 1.836%, and the minimum impregnation rate of the oil into the brush according to the inventive example 15 was 1.635%. Therefore, the maximum reduction rate of the impregnation rate of the oil into the brush according to the inventive example 15 was 0.201%.

During the use of the brush, the temperature of the brush increases to about 120° C. due to friction between the brush and the rotating body. In this case, viscosity of the oil will decrease. Even in such a case, exudence of the oil from the brush base material is prevented by a reduction in maximum reduction rate of the impregnation rate of the oil to 1% or less. Thus, lubricity of the brush can be maintained over a long period of time. Further, a contaminant in the vicinity of the brush due to the exudence of the oil from the brush base material can be prevented.

INDUSTRIAL APPLICABILITY

The present invention can be effectively utilized for various types of motors.

The invention claimed is:

1. A metal-carbonaceous brush including:
   a carbonaceous material made of a plurality of carbonaceous particles;
   metal mixed with the carbonaceous material; and
   oil with which the carbonaceous material is impregnated, wherein
   a ratio of the metal mixed with the carbonaceous material to the carbonaceous material is 10% by weight or more and 60% by weight or less and the oil is a mixed oil of 90% by weight or more and 99% by weight or less of a petroleum hydrocarbon oil and 1 by weight or more and 10% by weight or less of a silicone oil, or the oil is a mixed oil of 90% by weight or more and 99.5% by weight or less of the petroleum hydrocarbon oil and 0.5% by weight or more and 10% by weight or less of a dimethyl silicone oil.

2. The metal-carbonaceous brush according to claim 1, wherein
   an impregnation rate of the oil to the mixed carbonaceous material and metal is 0.5% by weight or more.

3. The metal-carbonaceous brush according to claim 1, wherein
   a decrease of an impregnation ratio of the oil is 1% or less in 400 hours in an atmosphere having a temperature of 120° C.

4. The metal-carbonaceous brush according to claim 1, wherein
   the oil includes a synthetic hydrocarbon oil, an ester oil, a mineral oil or a petroleum hydrocarbon oil, or a mixed oil of these.

5. The metal-carbonaceous brush according to claim 4, wherein
   the oil is a mixed oil of 90% by weight or more and 99% by weight or less of the synthetic hydrocarbon oil and 1% by weight or more and 10% by weight or less of a silicone oil.

6. The metal-carbonaceous brush according to claim 4, wherein
   the oil is a mixed oil of 90% by weight or more and 99.5% by weight or less of the synthetic hydrocarbon oil and 0.5% by weight or more and 10% by weight or less of a dimethyl silicone oil.

7. The metal-carbonaceous brush according to claim 1, wherein
   the metal includes electrolytic copper powder.

8. A method of manufacturing a metal-carbonaceous brush including the steps of:
   fabricating a carbonaceous material by mixing carbon powder and a binder;
   mixing 10% by weight or more and 60% by weight or less of metal to the fabricated carbonaceous material;
   forming the mixed carbonaceous material and metal;
   thermally processing the formed carbonaceous material and metal; and
   impregnating the thermally processed carbonaceous material with oil.

9. The method of manufacturing the metal-carbonaceous brush according to claim 8, wherein the step of forming the carbonaceous material and metal includes pressurizing the carbonaceous material and metal such that the carbonaceous material and metal have a specific gravity of 2.26 g/cm$^3$ or less.

10. The method of manufacturing the metal-carbonaceous brush according to claim 8, wherein
the step of impregnation with oil includes immersing the carbonaceous material and metal in oil having a temperature of 80° C. or more and 120° C. or less.

11. The method of manufacturing the metal-carbonaceous brush according to claim 10, wherein
the step of impregnation with oil includes immersing the carbonaceous material and metal in oil having a temperature of 90° C. or more and 110° C. or less.

* * * * *